United States Patent
Guo et al.

(10) Patent No.: US 11,772,681 B2
(45) Date of Patent: Oct. 3, 2023

(54) METHOD AND APPARATUS FOR PROCESSING AUTONOMOUS DRIVING SIMULATION DATA, AND ELECTRONIC DEVICE

(71) Applicant: BAIDU.COM TIMES TECHNOLOGY (BEIJING) CO., LTD., Beijing (CN)

(72) Inventors: Shengjian Guo, Beijing (CN); Zhisheng Hu, Beijing (CN); Zhenyu Zhong, Beijing (CN); Kang Li, Beijing (CN)

(73) Assignee: BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 157 days.

(21) Appl. No.: 17/463,501

(22) Filed: Aug. 31, 2021

(65) Prior Publication Data
US 2022/0126860 A1    Apr. 28, 2022

(51) Int. Cl.
| | | |
|---|---|---|
| *G07C 5/04* | (2006.01) | |
| *B60W 60/00* | (2020.01) | |
| *B60W 50/00* | (2006.01) | |
| *H04L 65/61* | (2022.01) | |

(52) U.S. Cl.
CPC ...... *B60W 60/001* (2020.02); *B60W 50/0098* (2013.01); *G07C 5/04* (2013.01); *H04L 65/61* (2022.05); *B60W 2050/0022* (2013.01); *B60W 2556/35* (2020.02); *B60W 2556/45* (2020.02)

(58) Field of Classification Search
None
See application file for complete search history.

(56) References Cited

U.S. PATENT DOCUMENTS

| | | | | |
|---|---|---|---|---|
| 2014/0303842 A1* | 10/2014 | Boelter | ............. | B60W 50/0098 701/36 |
| 2021/0129862 A1* | 5/2021 | Kim | ................... | G01C 21/3815 |
| 2022/0156665 A1* | 5/2022 | Beth | ................... | B60W 60/001 |
| 2022/0180748 A1* | 6/2022 | Kwak | ................... | G08G 1/163 |
| 2022/0250646 A1* | 8/2022 | Kobilarov | ......... | B60W 50/0097 |

\* cited by examiner

*Primary Examiner* — James M McPherson
(74) *Attorney, Agent, or Firm* — Maschoff Brennan

(57) ABSTRACT

A method for processing autonomous driving simulation data. The method includes: determining a type of a message transmitted between a simulation system and an auto driving system (ADS); determining a data acquisition mode based on the type of the message; obtaining a data stream transmitted between the simulation system and the ADS based on the data acquisition mode; and determining performance of the ADS based on the data stream.

16 Claims, 3 Drawing Sheets

METHOD AND APPARATUS FOR PROCESSING AUTONOMOUS DRIVING SIMULATION DATA, AND ELECTRONIC DEVICE

TECHNICAL FIELD

The disclosure relates to a field of data processing technology, in particular to a field of artificial intelligence technology such as autonomous driving and intelligent transportation, and further relates to a method for processing autonomous driving simulation data, an apparatus for processing autonomous driving simulation data and an electronic device.

BACKGROUND

With the vigorous development of computer technologies, the field of artificial intelligence such as autonomous driving and intelligent transportation has been developed rapidly. In a safety test of an autonomous driving system, a simulation test is an important supplement for an actual road test, and processing of simulation data is very important.

SUMMARY

Embodiments of the disclosure provide a method for processing autonomous driving simulation data, an apparatus for processing autonomous driving simulation data and an electronic device.

According to a first aspect, the disclosure provides a method for processing autonomous driving simulation data. The method includes: determining a type of a message transmitted between a simulation system and an auto driving system (ADS); determining a data acquisition mode based on the type of the message; obtaining a data stream transmitted between the simulation system and the ADS based on the data acquisition mode; and determining performance of the ADS based on the data stream.

According to a second aspect, the disclosure provides an electronic device. The electronic device includes: at least one processor and a memory communicatively connected to the at least one processor. The memory stores instructions executable by the at least one processor, and when the instructions are executed by the at least one processor, the at least one processor is caused to execute the method for processing autonomous driving simulation data according to embodiments of the first aspect.

According to a third aspect, the disclosure provides a non-transitory computer-readable storage medium storing computer instructions. The storage medium has a computer program stored thereon. The computer instructions are configured to cause a computer to execute the method for processing autonomous driving simulation data according to embodiments of the first aspect.

It should be understood that the content described in this section is not intended to identify the key or important features of the embodiments of the disclosure, nor is it intended to limit the scope of the disclosure. Additional features of the disclosure will be easily understood through the following description.

BRIEF DESCRIPTION OF THE DRAWINGS

The drawings are used to better understand the solution and do not constitute a limitation of the disclosure, in which.

DETAILED DESCRIPTION

Figure 1:
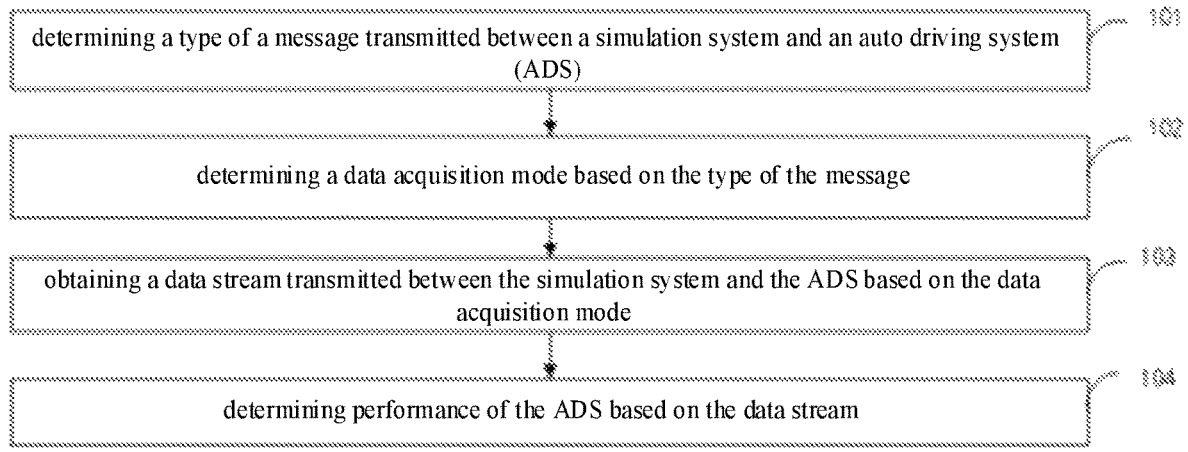
FIG. 1 is a flowchart of a method for processing autonomous driving simulation data according to an embodiment of the disclosure.

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Data processing includes collecting, storing, retrieving, processing, transforming and transmitting data. Data processing data may be implemented in different ways depending on a structure and an operating mode of a processing device, and a spatial and temporal distribution of data. Different processing ways require different hardware and software supports. Each processing way has its own characteristics, and an appropriate processing way is selected according to the actual environment of the application problem.

Artificial Intelligence (AI) is a discipline that studies how to simulate certain thinking processes and intelligent behaviors (such as learning, reasoning, thinking and planning) by computers, which has both hardware-level technologies and software-level technologies. Artificial intelligence hardware technologies generally include technologies such as sensors, dedicated artificial intelligence chips, cloud computing, distributed storage, and big data processing. Artificial intelligence software technologies generally include computer vision technology, speech recognition technology, natural language processing technology, and its learning/deep learning, big data processing technology, knowledge map technology and other aspects.

Autonomous driving refers to an assisted driving system that can assist the driver to steer and keep driving on the road, and achieve a series of operations such as following, braking, and changing lanes. The driver can control the vehicle at any time, and the system will remind the driver to control the vehicle under certain circumstances.

Intelligent transportation is an effective integration of advanced information technology, data communication transmission technology, electronic sensing technology, control technology, and computer technology in the entire ground traffic management system to create an effective, real-time, accurate and efficient integrated transportation management system which consists of a traffic information service system and a traffic management system.

A method for processing autonomous driving simulation data, an apparatus for processing autonomous driving simulation data and an electronic device of the embodiments of the disclosure will be described with reference to the accompanying drawings.

The method for processing autonomous driving simulation data according to an embodiment of the disclosure may be executed by the apparatus for processing autonomous driving simulation data according to an embodiment of the disclosure, and the apparatus may be configured in an electronic device.

FIG. 1 is a flowchart of a method for processing autonomous driving simulation data according to an embodiment of the disclosure.

As illustrated in FIG. 1, the method for processing autonomous driving simulation data may include the following steps.

In 101, a type of a message transmitted between a simulation system and an ADS is determined.

Generally, in a safety test of the ADS, a simulation test is an important supplement for an actual road test. Through the simulation test, important scenes, common traffic conditions, and various sensor data can be simulated on a virtual simulation system.

In an actual implementation, the simulation data can be obtained first, and then the simulation data can be processed to determine the performance of the ADS, such as safety and reliability related vulnerabilities or defects of the ADS, and then the ADS is repaired to improve the performance of the ADS. When the performance of the ADS meets certain conditions, the actual road test is carried out. Therefore, in order to improve the accuracy and reliability of the actual road test, acquisition and processing of the simulation data is very important. In the embodiment of the disclosure, considering the diversity of the simulation system and the ADS, the type of the message transmitted between the simulation system and the ADS can be determined, and then according to the type of the message, the data transmitted between the simulation system and the ADS is obtained.

It can be understood that there are different types of messages transmitted between the simulation system and the ADS, such as message type 1, message type 2 and message type 3, which is not limited in the disclosure.

Alternatively, the type of the message transmitted between the simulation system and the ADS can be determined based on a format of the message transmitted between the simulation system and the ADS.

There may be different formats of the messages transmitted between the simulation system and the ADS, and different message formats may correspond to the same message type or different message types, which is not limited in the disclosure.

For example, if the message format is format 1, the corresponding message type may be message type 1; or, if the message format is format 2, its corresponding message type may be message type 2, which is not limited in the disclosure.

Alternatively, the type of the message transmitted between the simulation system and the ADS can also be determined according to a type of the simulation system.

Different types of simulation systems may support the same message type or different message types, which is not limited in the disclosure.

For example, if the simulation system is simulation type 1, the message types supported by simulation system may be message type 1 and message type 2, the type of the message transmitted between the simulation system and the ADS can be determined, which can be message type 1 and message type 2.

It should be noted that the above examples are only illustrative, and cannot be used as limitations on the type of the simulation system, the message types supported by the simulation system, and the type of the messages transmitted between the simulation system and the ADS in the embodiments of the disclosure.

Alternatively, the type of the message transmitted between the simulation system and the ADS can also be determined according to the type of the ADS.

It is understandable that different types of ADSs may support the same message type or different message types. Therefore, in the embodiment of the disclosure, the message type supported by the ADS can be determined according to the type of the ADS, so as to determine the type of the message transmitted between the simulation system and the ADS.

For example, if the ADS is type 1, and the message type supported by ADS is message type 2, it can be determined that the type of the message transmitted between the ADS and the simulation system is message type 2, which is not limited by the disclosure.

Alternatively, the type of the message transmitted between the simulation system and the ADS can also be determined according to the type of the simulation system and the type of the ADS.

It is understandable that different types of simulation systems may support the same message type or different message types. Different types of ADSs may also support the same message type or different message types. Therefore, in the embodiment of the disclosure, the message type supported by the simulation system and the message type supported by the ADS can be determined according to the type of the simulation system and the type of the ADS respectively, so as to determine the type of the message transmitted between the simulation system and the ADS.

For example, the type of the simulation system is simulation type 1, and the message type supported by simulation system includes message type 1, message type 2, and message type 3. The ADS is ADS 1, and the message type supported by ADS 1 includes message type 2 and message type 3. It can be determined that the type of the message transmitted between the simulation system and the ADS can include message type 2 and message type 3, which is not limited in the disclosure.

In 102, a data acquisition mode is determined based on the type of the message.

The data acquisition modes for different message types may be the same or different, which is not limited in the disclosure.

It can be understood that a correspondence between the message type and the data acquisition mode may be agreed upon, or may be configured in advance, which is not limited in the disclosure.

For example, if the message type is message type 1, the corresponding data acquisition mode may be mode 1. If the message type is message type 2, the corresponding data acquisition mode may be mode 3, which is not limited in the disclosure.

In 103, a data stream transmitted between the simulation system and the ADS is obtained based on the data acquisition mode.

There may be one or more data acquisition modes, which is not limited in the disclosure.

In addition, the data stream may be an ordered data sequence of bytes with a start point and an end point, which is not limited in the disclosure.

For example, in data acquisition mode 1, data acquisition is performed every 10 seconds. In data acquisition mode 2, data acquisition is performed every 30 seconds. If it is determined that the current data acquisition mode is data acquisition mode 1, the data stream transmitted between the simulation system and the ADS can be acquired every 10 seconds, which is not limited in the disclosure.

It can be understood that the data stream transmitted between the simulation system and the ADS may include the simulation data generated by the simulation system, or may include autonomous driving data generated by the ADS, which is not limited in the disclosure.

In 104, performance of the ADS is determined based on the data stream.

It is understandable that by analyzing and integrating data information in the data stream obtained from and transmitted between the simulation system and the ADS, a sequence of data structures that express states and behaviors of driving can be reconstructed, and further safety and reliability of the ADS can be determined by analyzing the sequence of data structures.

Alternatively, after the safety and the reliability of the ADS are determined, the ADS can be adjusted to improve the safety and the reliability of the ADS, thereby providing a reliable basis for the actual road test, and improving accuracy and reliability of the actual road test.

For example, by analyzing the driving speed data in the data stream and determining that the data is normal, it can be determined that the performance of the ADS meets the conditions. Or, if after analyzing the driving speed data in the data stream, it is determined that there is abnormal data in the driving speed data, it can be determined that the performance of the ADS needs to be improved, and the ADS can be adjusted based on the driving speed data.

In the embodiment of the disclosure, the type of the message transmitted between the simulation system and the ADS may be determined, and then the data acquisition mode is determined according to the message type. Based on the data acquisition mode, the data stream transmitted between the simulation system and the ADS can be obtained, and then the performance of the ADS can be determined according to the data stream. Therefore, by processing the data obtained from and transmitted between the simulation system and the ADS, the performance of the ADS can be accurately determined, thereby providing a basis for improving the performance of the ADS, and providing a reliable basis for the actual road test.

It can be understood that in an actual implementation, when acquiring the data stream transmitted between the simulation system and the ADS, there may be many situations. The above process will be further described below with reference to FIG. 2.

Figure 2:
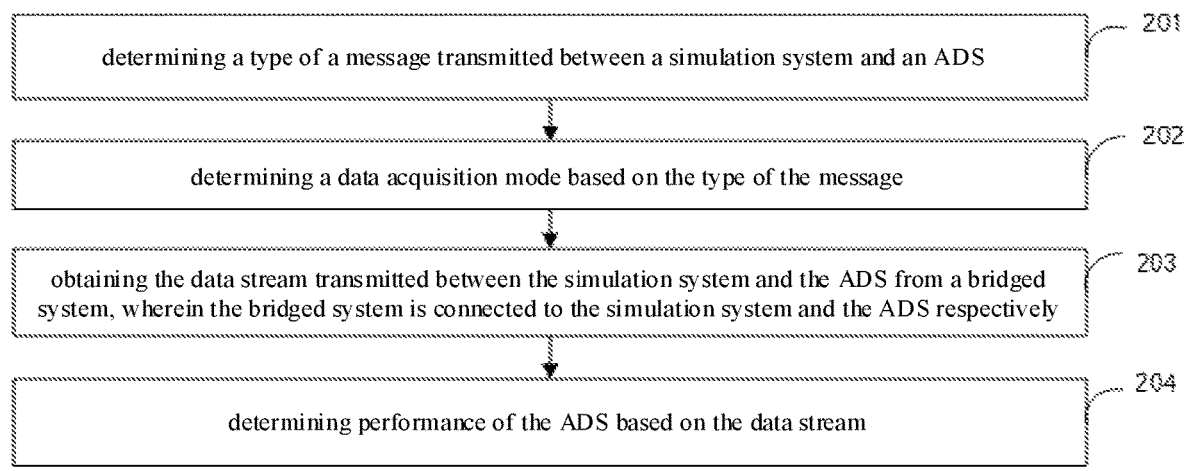
FIG. 2 is a flowchart of a method for processing autonomous driving simulation data according to an embodiment of the disclosure.

FIG. 2 is a flowchart of a method for processing autonomous driving simulation data according to another embodiment of the disclosure. As illustrated in FIG. 2, the method for processing autonomous driving simulation data may include the following steps.

In 201, a type of a message transmitted between the simulation system and the ADS is determined.

In 202, a data acquisition mode is determined based on the type of the message.

It should be noted that the specific content and implementation of 201 and 202 can be referred to the description of other embodiments of the disclosure, which will not be repeated here.

In 203, based on the data acquisition mode, a data stream transmitted between the simulation system and the ADS is obtained from a bridged system, the bridged system is connected to the simulation system and the ADS respectively.

The bridged system can support multiple message types, which can match the type of the simulation system and the type of the ADS.

For example, the simulation system supports message type 1 and message type 2, the ADS supports message type 1, message type 2, and message type 3, and the bridged system may be any bridged system or bridged component that supports message type 1, message type 2 and message type 3, which is not limited in the disclosure.

It is understandable that the bridged system interacts with the simulation system and the ADS in two directions. That is, data can be transmitted between the simulation system and the ADS through the bridged system. For example, the simulation data generated by the simulation system can be transmitted to the ADS through the bridged system, and the autonomous driving data generated by the ADS can be transmitted to the simulation system through the bridged system, which is not limited in the disclosure.

In the embodiment of the disclosure, in order to ensure integrity and reliability of the data obtained from and transmitted between the simulation system and the ADS, the data stream transmitted between the simulation system and the ADS can be obtained from the bridged system, such that the acquired data can be underlying data, and the acquired data can be as complete and accurate as possible.

Alternatively, the data stream transmitted between the simulation system and the ADS can also be obtained from the simulation system and the ADS, respectively.

It can be understood that data generated during a simulation process can be saved in the simulation system, and data generated during an autonomous driving process can be saved in the ADS. Therefore, the data stream transmitted between the simulation system and the ADS can be obtained from the simulation system and the ADS, respectively.

For example, the data stream transmitted between the simulation system and the ADS is obtained respectively from the simulation system and the ADS after data transmission occurs between the simulation system and the ADS. Alternatively, it is also possible to obtain the data stream transmitted between the simulation system and the ADS from the simulation system and the ADS periodically, which is not limited in the disclosure.

Alternatively, the data stream corresponding to a preset theme can also be obtained according to a theme corresponding to each data stream transmitted between the simulation system and the ADS.

Different data streams may correspond to the same theme, or different themes, which is not limited in the disclosure.

In addition, the preset theme may be a default theme, or may also be determined in other ways, which is not limited in the disclosure.

For example, assume that the determined preset theme is "driving speed". If the theme corresponding to data stream 1 transmitted between the simulation system and the ADS is "driving direction" and the theme corresponding to data stream 2 is "driving speed", then data stream 2 corresponding to the theme "driving speed" can be obtained, which is not limited in the disclosure.

It can be understood that there may be one or more preset themes. For example, if there are multiple preset themes, data streams corresponding respectively to the preset themes can be obtained.

Alternatively, before obtaining the data stream corresponding to the preset theme, the preset theme may be determined according to an autonomous driving performance to be detected.

The autonomous driving performance to be detected may be set in advance, or may also be adjusted as needed, which is not limited in the disclosure.

It can be understood that the preset themes corresponding to different autonomous driving performances to be detected may be the same or different, which is not limited in the disclosure.

For example, if the autonomous driving performance to be detected is: whether the driving state is correct, the corresponding preset theme may be "driving state". Or, the autonomous driving performance to be detected is: whether the driving speed is out of the range, then the corresponding preset theme may be "driving speed", which is not limited in the disclosure.

Alternatively, the preset theme may also be determined according to an obtained configuration instruction.

For example, if the obtained configuration instruction is: acquiring the driving speed data, then it can be determined that the preset theme is "driving speed". If the theme corresponding to data stream 1 transmitted between the simulation system and the ADS is "driving speed" and the theme corresponding to data stream 2 is "driving state", then data stream 1 corresponding to the theme "driving speed" can be obtained, which is not limited in the disclosure.

In 204, performance of the ADS is determined based on the data stream.

It should be noted that, for the specific content and implementation of 204, reference may be made to the description of other embodiments of the disclosure, which will not be repeated here.

In the embodiments of the disclosure, the type of the message transmitted between the simulation system and the ADS can be determined, the data acquisition mode is determined based on the type, then the data stream transmitted between the simulation system and the ADS is obtained from the bridged system based on the data acquisition mode, and the performance of the ADS is determined based on the data stream. Therefore, the performance of the ADS can be accurately determined by processing the data obtained from and transmitted between the simulation system and the ADS, thereby providing a basis for improving the performance of the ADS, and providing a reliable basis for an actual road test.

It can be understood that in an actual implementation, the data stream includes a data sequence and a timestamp corresponding to each data, so that the data sequence can be combined according to the timestamp corresponding to each data in the data stream, so as to determine environmental data and autonomous driving data at each timestamp, and then determine the performance of the ADS. The above process will be further described with reference to FIG. 3 below.

Figure 3:
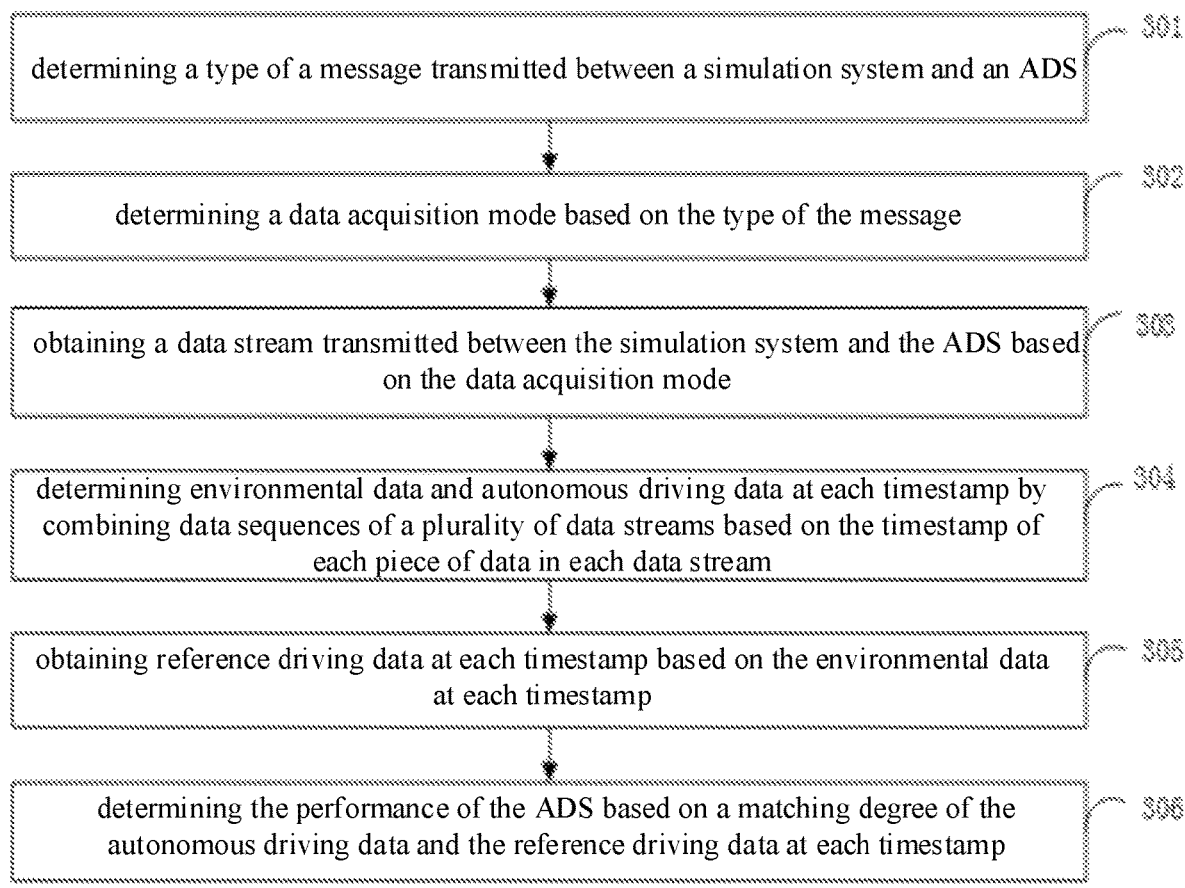
FIG. 3 is a flowchart of a method for processing autonomous driving simulation data according to an embodiment of the disclosure.

FIG. 3 is a flowchart of a method for processing autonomous driving simulation data according to another embodiment of the disclosure.

As shown in FIG. 3, the method for processing autonomous driving simulation data may include the following steps.

In 301, a type of a message transmitted between the simulation system and the ADS is determined.

In 302, a data acquisition mode is determined based on the type of the message.

In 303, a data stream transmitted between the simulation system and the ADS is obtained based on the data acquisition mode.

It should be noted that the specific content and implementation of 301 to 303 can be referred to the descriptions of other embodiments of the disclosure, which will not be repeated here.

In 304, environmental data and autonomous driving data at each timestamp are determined by combining data sequences of a plurality of data streams based on the timestamp of each piece of data in each data stream.

The environmental data may include sensor data generated by the simulation system and observable data generated by the ADS, such as lanes, outside pedestrians, which is not limited in the disclosure.

In addition, the autonomous driving data may be data generated by the ADS during an autonomous driving process, which is not limited in the disclosure.

Multiple data sequences at the same timestamp in multiple data streams can be combined, so that the environmental data and the autonomous driving data at each timestamp can be obtained.

In 305, reference driving data at each timestamp is obtained based on the environmental data at each timestamp.

There may be many ways to determine the reference driving data.

For example, the reference driving data can be obtained through a reference model. For example, the environmental data can be input into the reference model as an event, and a model state corresponding to the environmental data can be generated, that is, the reference driving data corresponding to the environmental data can be output.

The reference model may be any model that has been trained in advance, and the environmental data is input into the reference model to output the reference driving data corresponding to the environmental data, which is not limited in the disclosure.

Alternatively, the reference driving data can also be determined based on collected actual driving data and actual driving behavior. For example, the simulation system performs simulation based on the collected actual driving data, the obtained data is the corresponding environmental data, and the normal driving behavior actually collected is the reference driving data.

It should be noted that the above examples are only illustrative, and cannot be used as limitations on the manner of determining the reference driving data in the embodiments of the disclosure.

In 306, performance of the ADS is determined based on a matching degree of the autonomous driving data and the reference driving data at each timestamp.

It can be understood that the higher the matching degree between the autonomous driving data and the reference driving data, the better the performance of the ADS, and the lower the matching degree between the autonomous driving data and the reference driving data, the worse the performance of the ADS.

There may be multiple ways of determining the matching degree between the autonomous driving data and the reference driving data at each timestamp.

For example, the driving speed, the driving direction and an acceleration in the autonomous driving data can be compared with the corresponding driving speed, the corresponding driving direction, and the corresponding acceleration in the reference driving data at the same timestamp as the autonomous driving data, to determine the matching degree of the driving speed and the corresponding driving speed, the matching degree of the driving direction and the corresponding driving direction and the matching degree of the acceleration and the corresponding acceleration. Then, the matching degrees corresponding to respective pieces of data are combined to determine the matching degree between the autonomous driving data and the reference driving data at the same timestamp. Afterwards, the performance of the ADS can be determined according to the determined matching degree, and the ADS can be adjusted accordingly to improve the ADS.

Alternatively, a weight of each piece of data in the driving data may be configured in advance, and the matching degree of each piece of driving data between the autonomous driving data and the reference driving data at the same timestamp is determined, and weighted fusion is performed to determine the matching degree between the autonomous driving data and the reference driving data at the same timestamp.

It should be noted that the foregoing example is only illustrative, and cannot be used as a limitation on the manner of determining the matching degree between the autonomous driving data and the reference driving data at each timestamp in the embodiments of the disclosure.

Alternatively, the ADS can be adjusted according to the matching degree between the autonomous driving data and the reference driving data at each timestamp to improve the autonomous driving performance.

For example, if the matching degree of the "driving speed" between the autonomous driving data and the reference driving data is low, parameters related to the "driving speed" in the ADS can be adjusted, which is not limited in the disclosure.

In the embodiments of the disclosure, when determining the performance of the ADS, the timestamp corresponding to each piece of data in the data stream is fully considered, and the performance of the ADS is determined based on the matching degree between the autonomous driving data and the reference driving data at each timestamp, which can make the determined performance of the ADS more accurate and reliable. After analyzing the determined performance of the ADS, the ADS can be adjusted specifically to improve the corresponding performance of the ADS, thereby providing a reliable basis for the subsequent actual road test and improving the accuracy and reliability of the actual road test.

It can be understood that the method for processing autonomous driving simulation data of the disclosure can be applied to any autonomous driving scenario, which is not limited in the disclosure.

Taking the ADS and the simulation system shown in FIG. 3A as an example, the method for processing the autonomous driving simulation data of the disclosure will be described below.

Figure 4:
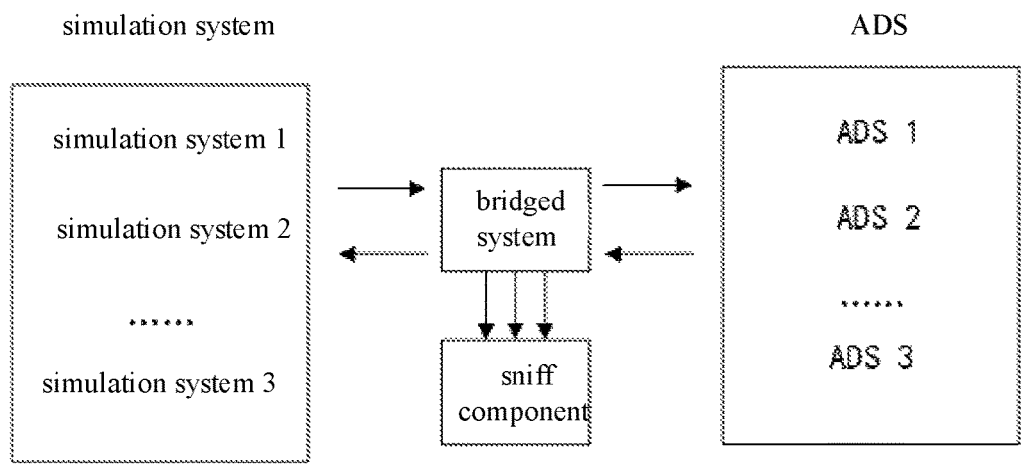
FIG. 4 is a schematic diagram of an auto driving system and a simulation system according to an embodiment of the disclosure.

As shown in FIG. 4, the left side shows any simulation system, for example, simulation system 1, simulation system 2 and simulation system 3, which is not limited in the disclosure.

The right side shows any ADS, such as an open source system or a closed source system, which can be any ADS that can match the message type supported by the simulation system, such as ADS1, ADS2 and ADS3, which is not limited in the disclosure.

In addition, the bridged system can interact with the simulation system on the left and the ADS on the right, which can be any system or component that supports the message type of the simulation system and the ADS, which is not limited in the disclosure.

In addition, a sniff component can be any component or system that can sniff the autonomous driving data. The sniff component can automatically switch to a sniffing function and connect to a corresponding port according to the message type supported by the bridged system, to obtain the data stream transmitted between the simulation system and the ADS.

A configuration item of the sniff component can be set in the form of a configuration file or a command line parameter. The configuration item may include: a bridged system and ports, a uniform resource identifier (URI) corresponding to the data stream of the preset theme, and a number of sniffing threads. Or, in the case that no configuration file or command line parameter is provided, the preset theme can be a default theme determined by the system, or the data stream of the preset theme can be sniffed at all ports in the current bridged system.

It can be understood that, in the schematic diagram shown in FIG. 4, the simulation system can send sensor data generated by itself to the ADS through the bridged system, and the ADS can transmit generated driving decisions and driving states to the simulation system through the bridged system. The sniff component can obtain the data stream transmitted between the simulation system and the ADS from the bridged system. Then, according to the timestamp corresponding to each piece of data in each data stream, data sequences in a plurality of data streams can be fused to determine the environmental data and the autonomous driving data at each timestamp. Afterwards, the environmental data at each timestamp can be input into a reference model to obtain the corresponding reference driving data, the reference driving data can be matched with the autonomous driving data, and the performance of the ADS can be determined based on the matching degree of between the reference driving data and the autonomous driving data.

It should be noted that the above examples are only illustrative, and cannot be used as limitations on the simulation system, the ADS, and the way of data transmission between the simulation system and the ADS in the embodiments of the disclosure.

In the embodiment of the disclosure, the type of the message transmitted between the simulation system and the ADS can be determined, and then the data acquisition mode can be determined according to the type. Based on the data acquisition mode, the data stream transmitted between the simulation system and the ADS can be obtained. According to the timestamp corresponding to each piece of data in each data stream, the data sequences in the plurality of data stream can be combined to determine the environmental data and the autonomous driving data at each timestamp. According to the environmental data at each timestamp, the reference driving data at each time stamp is obtained, and then the performance of the ADS can be determined according to the matching degree between the autonomous driving data and the reference driving data at each timestamp. Therefore, by processing the data obtained from and transmitted between the simulation system and the ADS, the performance of the ADS can be accurately determined, thereby providing a basis for improving the performance of the ADS, and providing a reliable basis for the actual road test.

In order to implement the above embodiments, the disclosure further provides an apparatus for processing autonomous driving simulation data.

Figure 5:
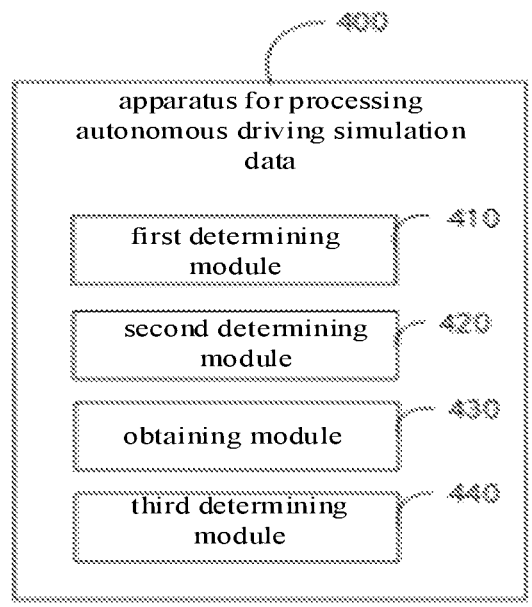
FIG. 5 is a block diagram of an apparatus for processing autonomous driving simulation data according to an embodiment of the disclosure.

FIG. 5 is a block diagram of an apparatus for processing autonomous driving simulation data according to an embodiment of the disclosure.

As shown in FIG. 5, the apparatus 400 includes: a first determining module 410, a second determining module 420, an obtaining module 430, and a third determining module 440.

The first determining module 410 is configured to determine a type of a message transmitted between a simulation system and an auto driving system (ADS).

The second determining module 420 is configured to determine a data acquisition mode based on the type of the message.

The obtaining module 430 is configured to obtain a data stream transmitted between the simulation system and the ADS based on the data acquisition mode.

The third determining module 440 is configured to determine performance of the ADS based on the data stream.

Alternatively, the obtaining module 430 is configured to: obtain the data stream transmitted between the simulation system and the ADS from a bridged system, in which the bridged system is connected to the simulation system and the ADS respectively; or, obtain the data stream transmitted between the simulation system and the ADS respectively from the simulation system and the ADS.

Alternatively, the first determining module 410 is configured to: determine the type of the message transmitted between the simulation system and the ADS based on a format of the message transmitted between the simulation system and the ADS; or, determine the type of the message transmitted between the simulation system and the ADS based on a type of the simulation system and/or the ADS.

Alternatively, the obtaining module 430 is configured to: obtain the data stream corresponding to a preset theme based on themes of respective data streams transmitted between the simulation system and the ADS.

Alternatively, the first determining module 410 is configured to: determine the preset theme based on an autonomous driving performance to be detected; or, determine the preset theme based on a configuration instruction.

Alternatively, each data stream includes a data sequence and a timestamp of each piece of data, and the third determining module 440 is configured to: determine environmental data and autonomous driving data at each timestamp by combining data sequences of a plurality of data streams based on the timestamp of each piece of data in each data stream; obtain reference driving data at each timestamp based on the environmental data at each timestamp; and determine the performance of the ADS based on a matching degree of the autonomous driving data and the reference driving data at each timestamp.

The functions and specific implementation principles of the above-mentioned modules in the embodiments of the disclosure are referred to the above-mentioned method embodiments, which will not be repeated here.

With the apparatus of the embodiments of the disclosure, the type of the message transmitted between the simulation system and the ADS is determined firstly, the data acquisition mode is determined based on the type, then the data stream transmitted between the simulation system and the ADS is obtained based on the data acquisition mode, and the performance of the ADS is determined based on the data stream. Therefore, the performance of the ADS can be accurately determined by processing the data obtained from and transmitted between the simulation system and the ADS, thereby providing a basis for improving the performance of the ADS, and providing a reliable basis for an actual road test.

According to the embodiments of the disclosure, the disclosure also provides an electronic device, a readable storage medium and a computer program product.

Figure 6:
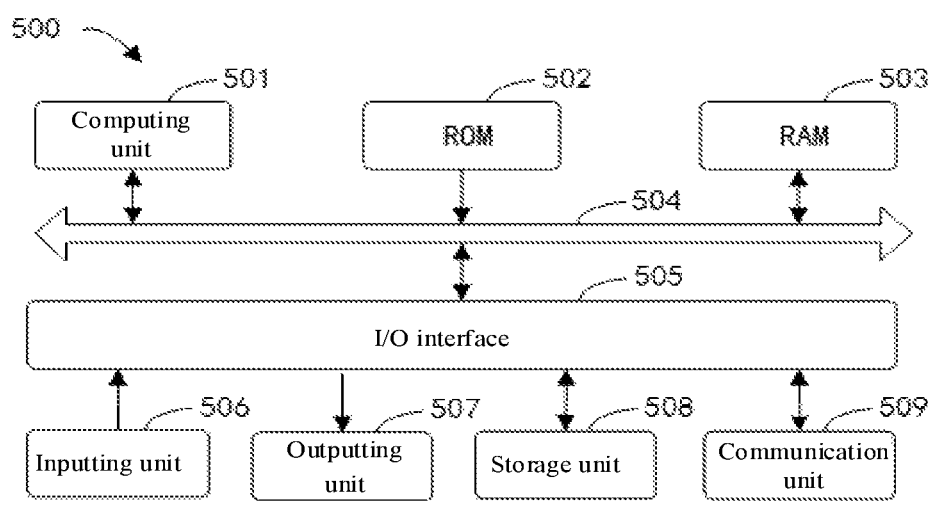
FIG. 6 is a block diagram of an electronic device used to implement the method for processing autonomous driving simulation data according to an embodiment of the disclosure.

FIG. 6 is a block diagram of an electronic device 500 configured to implement the method according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the device 500 includes a computing unit 501 performing various appropriate actions and processes based on computer programs stored in a read-only memory (ROM) 502 or computer programs loaded from the storage unit 508 to a random access memory (RAM) 503. In the RAM 503, various programs and data required for the operation of the device 500 are stored. The computing unit 501, the ROM 502, and the RAM 503 are connected to each other through a bus 504. An input/output (I/O) interface 505 is also connected to the bus 504.

Components in the device 500 are connected to the I/O interface 505, including: an inputting unit 506, such as a keyboard, a mouse; an outputting unit 507, such as various types of displays, speakers; a storage unit 508, such as a disk, an optical disk; and a communication unit 509, such as network cards, modems, wireless communication transceivers, and the like. The communication unit 509 allows the device 500 to exchange information/data with other devices through a computer network such as the Internet and/or various telecommunication networks.

The computing unit 501 may be various general-purpose and/or dedicated processing components with processing and computing capabilities. Some examples of computing unit 501 include, but are not limited to, a central processing unit (CPU), a graphics processing unit (GPU), various dedicated artificial intelligence (AI) computing chips, various computing units that run machine learning model algorithms, and a digital signal processor (DSP), and any appropriate processor, controller and microcontroller. The computing unit 501 executes the various methods and processes described above. For example, in some embodiments, the method may be implemented as a computer software program, which is tangibly contained in a machine-readable medium, such as the storage unit 508. In some embodiments, part or all of the computer program may be loaded and/or installed on the device 500 via the ROM 502 and/or the communication unit 509. When the computer program is loaded on the RAM 503 and executed by the computing unit 501, one or more steps of the method described above may be executed. Alternatively, in other embodiments, the computing unit 501 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service. The server may also be a server of a distributed system, or a server combined with a block-chain.

In the technical solution of the disclosure, the type of the message transmitted between the simulation system and the ADS is determined, the data acquisition mode is determined based on the type, then the data stream transmitted between the simulation system and the ADS is obtained based on the data acquisition mode, and the performance of the ADS is determined based on the data stream. Therefore, the performance of the ADS can be accurately determined by processing the data transmitted between the simulation system and the ADS, thereby providing a basis for improving the performance of the ADS, and providing a reliable basis for actual road test.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A method for processing autonomous driving simulation data, comprising:
    determining a type of a message transmitted between a simulation system and an auto driving system (ADS);
    determining a data acquisition mode based on the type of the message;
    obtaining a data stream transmitted between the simulation system and the ADS based on the data acquisition mode; and
    determining performance of the ADS based on the data stream,
    wherein each data stream comprises a data sequence and a timestamp of each piece of data, and determining the performance of the ADS based on the data stream comprises:
        determining environmental data and autonomous driving data at each timestamp by combining data sequences of a plurality of data streams based on the timestamp of each piece of data in each data stream;

obtaining reference driving data at each timestamp based on the environmental data at each timestamp;
comparing each kind of driving data in the autonomous driving data with the kind of driving data in the reference driving data at a timestamp same as the autonomous driving data to determine a matching degree of each kind of driving data at the timestamp;
performing weighted fusion on the matching degree of each kind of driving data at the timestamp based on a predetermined weight of each kind of driving data to obtain the matching degree between the autonomous driving data and the reference driving data at the timestamp; and
determining the performance of the ADS based on the matching degree between the autonomous driving data and the reference driving data at each timestamp.

2. The method according to claim 1, wherein obtaining the data stream transmitted between the simulation system and the ADS based on the data acquisition mode, comprises one of the following operations:
obtaining the data stream transmitted between the simulation system and the ADS from a bridged system, wherein the bridged system is connected to the simulation system and the ADS respectively; and
obtaining the data stream transmitted between the simulation system and the ADS respectively from the simulation system and the ADS.

3. The method according to claim 1, wherein determining the type of the message transmitted between the simulation system and the ADS comprises one of the following operations:
determining the type of the message transmitted between the simulation system and the ADS based on a format of the message transmitted between the simulation system and the ADS; and
determining the type of the message transmitted between the simulation system and the ADS based on a type of at least one of the simulation system and the ADS.

4. The method according to claim 1, wherein obtaining the data stream transmitted between the simulation system and the ADS comprises:
obtaining the data stream corresponding to a preset theme based on themes of respective data streams transmitted between the simulation system and the ADS.

5. The method according to claim 4, further comprising one of the following operations:
determining the preset theme based on an autonomous driving performance to be detected; and,
determining the preset theme based on a configuration instruction.

6. An electronic device, comprising:
at least one processor; and
a memory communicatively connected to the at least one processor; wherein,
the memory stores instructions executable by the at least one processor, and when the instructions are executed by the at least one processor, the at least one processor is caused to perform a method for processing autonomous driving simulation data comprising:
determining a type of a message transmitted between a simulation system and an auto driving system (ADS);
determining a data acquisition mode based on the type of the message;
obtaining a data stream transmitted between the simulation system and the ADS based on the data acquisition mode; and
determining performance of the ADS based on the data stream, wherein each data stream comprises a data sequence and a timestamp of each piece of data, and determining the performance of the ADS based on the data stream comprises:
determining environmental data and autonomous driving data at each timestamp by combining data sequences of a plurality of data streams based on the timestamp of each piece of data in each data stream;
obtaining reference driving data at each timestamp based on the environmental data at each timestamp;
comparing each kind of driving data in the autonomous driving data with the kind of driving data in the reference driving data at a timestamp same as the autonomous driving data to determine a matching degree of each kind of driving data at the timestamp;
performing weighted fusion on the matching degree of each kind of driving data at the timestamp based on a predetermined weight of each kind of driving data to obtain the matching degree between the autonomous driving data and the reference driving data at the timestamp; and
determining the performance of the ADS based on the matching degree between the autonomous driving data and the reference driving data at each timestamp.

7. A non-transitory computer-readable storage medium storing computer instructions, wherein the computer instructions are configured to cause a computer to execute a method for processing autonomous driving simulation data comprising:
determining a type of a message transmitted between a simulation system and an auto driving system (ADS);
determining a data acquisition mode based on the type of the message;
obtaining a data stream transmitted between the simulation system and the ADS based on the data acquisition mode; and
determining performance of the ADS based on the data stream,
wherein each data stream comprises a data sequence and a timestamp of each piece of data, and determining the performance of the ADS based on the data stream comprises:
determining environmental data and autonomous driving data at each timestamp by combining data sequences of a plurality of data streams based on the timestamp of each piece of data in each data stream;
obtaining reference driving data at each timestamp based on the environmental data at each timestamp;
comparing each kind of driving data in the autonomous driving data with the kind of driving data in the reference driving data at a timestamp same as the autonomous driving data to determine a matching degree of each kind of driving data at the timestamp;
performing weighted fusion on the matching degree of each kind of driving data at the timestamp based on a predetermined weight of each kind of driving data to obtain the matching degree between the autonomous driving data and the reference driving data at the timestamp; and
determining the performance of the ADS based on the matching degree between the autonomous driving data and the reference driving data at each timestamp.

8. The method according to claim 1, wherein obtaining the reference driving data at each timestamp based on the environmental data at each timestamp, comprises:
inputting the environmental data at each timestamp to a reference model to obtain the reference driving data at each timestamp.

9. The electronic device according to claim 6, wherein obtaining the data stream transmitted between the simulation system and the ADS based on the data acquisition mode, comprises one of the following operations:
obtaining the data stream transmitted between the simulation system and the ADS from a bridged system, wherein the bridged system is connected to the simulation system and the ADS respectively; and
obtaining the data stream transmitted between the simulation system and the ADS respectively from the simulation system and the ADS.

10. The electronic device according to claim 6, wherein determining the type of the message transmitted between the simulation system and the ADS comprises one of the following operations:
determining the type of the message transmitted between the simulation system and the ADS based on a format of the message transmitted between the simulation system and the ADS; and
determining the type of the message transmitted between the simulation system and the ADS based on a type of at least one of the simulation system and the ADS.

11. The electronic device according to claim 6, wherein obtaining the data stream transmitted between the simulation system and the ADS comprises:
obtaining the data stream corresponding to a preset theme based on themes of respective data streams transmitted between the simulation system and the ADS.

12. The electronic device according to claim 11, wherein the at least one processor is further configured to perform one of the following operations:
determining the preset theme based on an autonomous driving performance to be detected; and
determining the preset theme based on a configuration instruction.

13. The storage medium according to claim 7, wherein obtaining the data stream transmitted between the simulation system and the ADS based on the data acquisition mode, comprises one of the following operations:
obtaining the data stream transmitted between the simulation system and the ADS from a bridged system, wherein the bridged system is connected to the simulation system and the ADS respectively; and
obtaining the data stream transmitted between the simulation system and the ADS respectively from the simulation system and the ADS.

14. The storage medium according to claim 7, wherein determining the type of the message transmitted between the simulation system and the ADS comprises one of the following operations:
determining the type of the message transmitted between the simulation system and the ADS based on a format of the message transmitted between the simulation system and the ADS; and
determining the type of the message transmitted between the simulation system and the ADS based on a type of at least one of the simulation system and the ADS.

15. The storage medium according to claim 7, wherein obtaining the data stream transmitted between the simulation system and the ADS comprises:
obtaining the data stream corresponding to a preset theme based on themes of respective data streams transmitted between the simulation system and the ADS.

16. The storage medium according to claim 15, wherein the computer instructions are further configured to cause the computer to perform one of the following operations:
determining the preset theme based on an autonomous driving performance to be detected; and
determining the preset theme based on a configuration instruction.

* * * * *